(12) United States Patent
Canter

(10) Patent No.: US 6,844,703 B2
(45) Date of Patent: Jan. 18, 2005

(54) BATTERY CELL BALANCING SYSTEM

(75) Inventor: Stanley Canter, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 10/218,995

(22) Filed: Aug. 14, 2002

(65) Prior Publication Data

US 2004/0032236 A1 Feb. 19, 2004

(51) Int. Cl.$^7$ ................................................. H02J 7/00

(52) U.S. Cl. ....................................................... 320/131

(58) Field of Search ................................. 320/131, 101, 320/121, 123, 125, 128; 323/282–285, 222, 224, 259, 263; 363/65, 16, 30

(56) References Cited

U.S. PATENT DOCUMENTS

| 5,477,132 | A | * | 12/1995 | Canter et al. | ............... | 323/282 |
| 5,614,847 | A | * | 3/1997 | Kawahara et al. | ............ | 326/98 |
| 5,982,143 | A | * | 11/1999 | Stuart | ......................... | 320/119 |
| 6,369,546 | B1 | * | 4/2002 | Canter | ........................ | 320/118 |

* cited by examiner

Primary Examiner—Pia Tibbits
(74) Attorney, Agent, or Firm—Artz & Artz, P.C.

(57) ABSTRACT

A battery cell balancing system (12) for a battery (30) having a plurality of cells (32) is provided. The system (12) includes a power supply (38) and a plurality of transformer/rectifier circuits (34) electrically coupled to the cells (32). Preferential charging occurs for a cell with the lowest state of charge. At least one current limiting device (36) is electrically coupled to the transformer/rectifier circuits (34) and the power supply (38). The current limiting device (36) buffers a source voltage from a reflected voltage of at least one of the plurality of cells (32). A method of performing the same is also provided.

20 Claims, 2 Drawing Sheets

BATTERY CELL BALANCING SYSTEM

TECHNICAL FIELD

The present invention relates generally to aeronautical vehicle systems, and more particularly, to a method and system for balancing cell voltage of a battery.

BACKGROUND OF THE INVENTION

A spacecraft may have several lithium-ion batteries, each of which having approximately thirty cells. The cells are sensitive to over-charging and over-discharging, thereby requiring complex protection circuits.

A common approach for charging the batteries and balancing charge of each cell includes the use of a power supply for each cell, totaling approximately 120 power supplies. As known in the art, it is desirable to minimize the number spacecraft system components and weight of the spacecraft. The above stated approach is complex and costly, especially for space applications, which are sensitive to weight and packaging constraints.

It is also desirable in space applications for systems to be reliable. Increasing number of battery system components adversely affects reliability of a battery system and ultimately a spacecraft itself.

Another battery charging method uses a primary/redundant charger and a primary/redundant discharger for the cells that are in series. A voltage clamp circuit is used to protect the cells from overcharging, and a disconnect switch and bypass switch protect the cells from over-discharging. This approach is also complex and costly. During charge of the cells valuable bus power is wasted when the voltage clamp is protecting the cells from overcharging. Also, the clamp circuit typically requires additional heat sinking to dissipate heat. There is a dependency on electro-mechanical devices to protect the cells from over discharging, and such devices have limited life cycles.

A dissipative cell balancing method has also been introduced, in which lithium-ion battery cells may be balanced on a spacecraft in a cost-effective manner. The method includes a resistor applied across each battery cell. Voltage across the cells is monitored by either a system operator or by computer. A resistor is disconnected when a desired voltage is reached across a cell of interest. Although, effective the method requires monitoring intelligence and some form of decision generation. Although this method may be cost effective it requires complex control techniques which tax limit control system intelligence. T he method uses complex computer software and significantly reduces onboard processor resources.

Additionally, a distributed converter method has been introduced including a balancing switch and a transformer/rectifier circuit associated with each cell of a battery. A multiplexer measures voltage of each cell. A controller operating the balancing switches such that each switch is in an "ON" state, or charging state, when voltage measured across a cell is below a first predetermined voltage level and in an "OFF" state when the cell voltage is above a second predetermined state. Although, this technique is cost effective it is also complex due to a need for control elements, thus reducing processor resources.

Prior art battery balancing techniques that preferentially charge a cell having a lowest state of charge are also inefficient. When a single cell is unable to charge, remaining cells are effected and are potentially not charged. A balancing system, using the preferentially charging technique, continuously attempts to charge the cell that is unable to charge, thus preventing other cells that have a state of charge higher than the unchargeable cell and lower than a desired state of charge from charging and the battery becomes inoperable.

Also, during discharge of a battery when a cell voltage drops below a certain value cell voltage reversal may occur. When cell voltage reversal occurs, cell potential inverts and the cell is shorted, also rendering the battery inoperable.

It is therefore desirable to provide a battery balancing technique that minimizes the number of system components, weight of a spacecraft, system complexity both in component quantity and control logic, and is cost effective and reliable.

SUMMARY OF THE INVENTION

The present invention provides a method and system for balancing cell voltage of a battery. A battery cell balancing system for a battery having a plurality of cells is provided. The system includes a power supply and a plurality of transformer/rectifier circuits electrically coupled to the cells. Preferential charging occurs for a cell with the lowest state of charge. At least one current limiting device is electrically coupled to the transformer/rectifier circuits and the power supply. The current limiting device buffers a source voltage from a reflected voltage of at least one of the plurality of cells. A method of performing the same is also provided.

One of several advantages of the present invention is that it provides a current limiting device between the power source and a power bus of the battery balancing system. In so doing, the present invention allows the power bus to perform substantially as an alternating current (AC) current source resulting in preferential charging of the battery cells when in combination with the transformer/rectifier circuits, such that the cell having a lowest state of charge is charged first.

Another advantage of the present invention is that control of the preferential charging is performed by self-contained random logic through statistical selection of the cells to be balanced, which increases reliability and life of the battery over prior battery balancing systems. The present invention associates the cells into subgroups, each cell may be a member of multiple subgroups, and randomly balances each subgroup. Association into subgroups reduces effect a single cell, that is unable to charge, may have on charging of other cells.

The present invention itself, together with further objects and attendant advantages, will be best understood by reference to the following detailed description, taken in conjunction with the accompanying drawing.

DETAILED DESCRIPTION OF THE PREFERRED EMBODIMENT

While the present invention is described with respect to a method and system for balancing battery cells, the present invention may be adapted for various applications and systems including: aeronautical systems, land-based systems, commercial systems, terrestrial industrial systems, vehicle systems, or other applications or systems known in the art.

In the following description, various operating parameters and components are described for one constructed embodiment. These specific parameters and components are included as examples and are not meant to be limiting.

Figure 1:
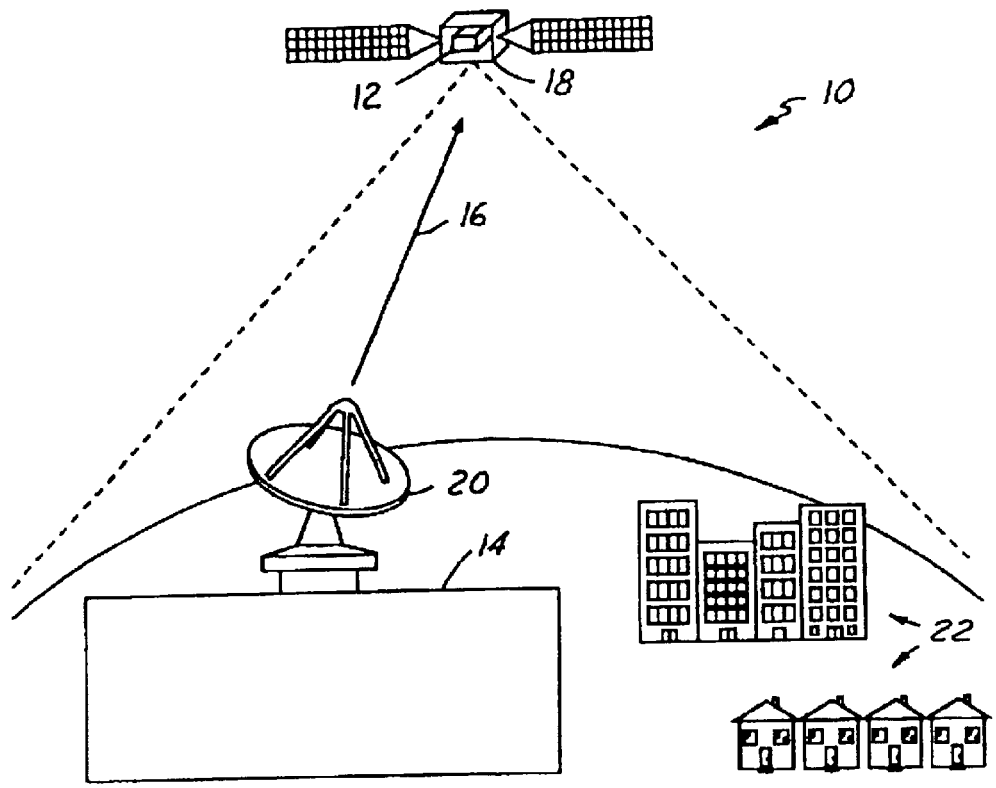
FIG. 1 is a perspective view of a satellite system utilizing a battery balancing system in accordance with an embodiment of the present invention.

Referring now to FIG. 1, a perspective view of a satellite system 10 utilizing a battery balancing system 12 in accordance with an embodiment of the present invention is shown. The system 10 includes a ground station 14 for transmitting communication signals 16 over various channels to a satellite 18 via a transceiver 20. The satellite 18 then retransmits the communication signals to multiple sites 22. The sites 22 may include both commercial and residential sites. The satellite 18 includes the balancing system 12. Of course, the system 10 may have multiple satellites having a version of the balancing system 12, multiple tranceivers, and multiple ground stations.

Figure 2:
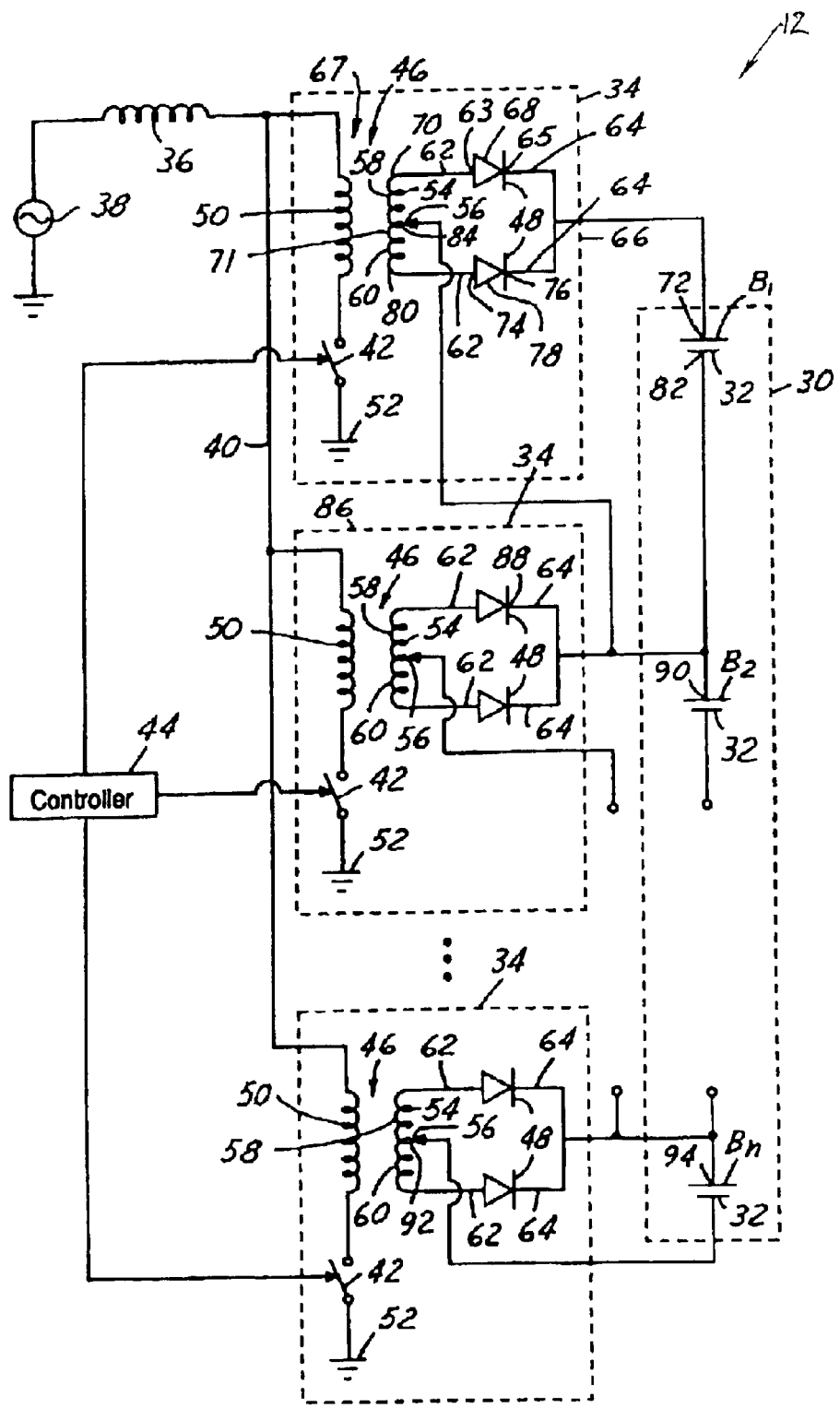
FIG. 2 is a block diagrammatic and schematic view of the battery balancing system in accordance with an embodiment of the present invention.

Referring now to FIG. 2 a block diagrammatic and schematic view of the battery balancing system 12 for a battery 30 in accordance with an embodiment of the present invention is shown. The battery 30 has multiple cells 32, each of which having a corresponding cell voltage. The balancing system 12 includes multiple transformer/rectifier circuits 34, each of which is associated with one of the cells 32. A current limiting device 36 is electrically coupled to a power supply 38 and a power bus 40, which is electrically coupled to the transformer/rectifier circuits 34. Although, the current limiting device 36 is shown as an inductor other current limiting devices known in the art may be used, such as a current limiting resistor or an active electronic devise. The transformer rectifier circuits 34 are in parallel in respect to the current limiting device 36 in series with the power supply 38 and the cells 32. Each transformer/rectifier circuit 34 has an associated switch 42 that is operated via a controller 44. The controller 44 determines which cells 32 to balance and operates the switches 42, accordingly, to allow preferential charging by the transformer/rectifier circuits 34.

The battery 30 may include any number of cells 32. Each cell 32 may be a Lithium-Ion cell or other type of cell known in the art. In one embodiment of the present invention the battery 30 contains twenty-four Lithium-Ion cells, as commonly used in satellite systems.

The transformer/rectifier circuits 34 include a transformer 46 and a pair of diodes 48. A primary coil 50 of the transformer 46 is in series with one of the switches 42 followed by a ground terminal 52. The primary coils 50 and switches 42 are together in parallel with the current limiting device 36 and power supply 38. The pair of diodes 48 perform as rectifiers preventing current flow to associated cells 32 when voltage differential across each diode 48 is below a corresponding diode forward bias voltage. Each secondary coil 54 of the transformers 46 are divided by a centertap 56 into an upper half 58 and a lower half 60. Each diode 48 has an anode terminal 62 and a cathode terminal 64.

Although, the following is a description of a first transformer/rectifier circuit 66, including a first transformer 67, other transformer/rectifier circuits 34 are similar. The first anode terminal 63 and the first cathode terminal 65, of first diode 68, is electrically coupled to a first end 70 of a secondary coil 71 and a positive terminal 72 of an associated first cell $B_1$, respectively. A second anode terminal 74 and a second cathode terminal 76, of a second diode 78, are electrically coupled to a second end 80 of the secondary coil 54 and a negative terminal 82 of the first cell $B_1$, respectively. A first centertap 84 of the secondary coil 71 is electrically coupled to a second transformer/rectifier circuit 86. The first centertap 84 is electrically coupled to first cathode terminal 88 of the second transformer/rectifier circuit 86 and to a second positive terminal 90 of a second cell $B_2$. Each cell 32 has an associated transformer/rectifier circuit 34 similar to that of first cell $B_1$. A centertap 92 of a $n^{th}$ cell $B_n$ is electrically coupled to a $n^{th}$ negative terminal 94 of the $n^{th}$ cell $B_n$, where n is the number of cells in the battery 30.

The current limiting device 36 buffers a source voltage of the power supply 38 from a cell voltage or reflected voltage of at least one of the cells 32. The current limiting device 36 allows the power bus 40 to perform substantially as an alternating current (AC) source. The current limiting device 36 prevents a cell voltage from reversing, causing the cell to short, during discharge. The current limiting device 36 may be of various style and type known in the art.

The controller 44 preferably includes multiple logic devices so as to randomly select groups of cells 32. The controller 44 may be a microprocessor based such as a computer having a central processing unit, memory (RAM and/or ROM), and associated input and output buses. The controller 44 may be a portion of a central vehicle main control unit, an interactive vehicle dynamics module, or a stand-alone controller. The controller 44 contains random logic as to randomly select a subgroup of the cells to be balanced. Although, in a preferred embodiment of the present invention, the system 12 is described as utilizing the controller 44, the system 12 may operate without the controller 44. The controller 44 may be utilized to form and balance subgroups of the cells 32, in turn increasing reliability of the system 12, or to perform other tasks known in the art.

Figure 3:
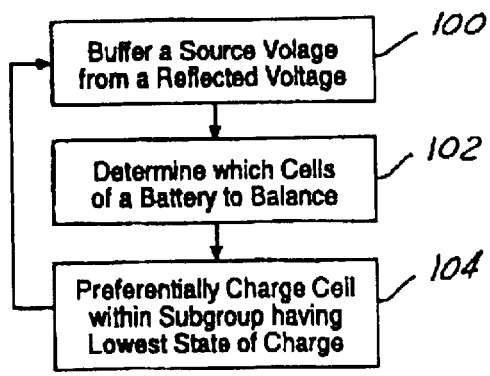
FIG. 3 is a logic flow diagram illustrating a method of balancing battery cells in accordance with an embodiment of the present invention.

Referring now to FIG. 3 a logic flow diagram illustrating a method of balancing the cells 32 in accordance with an embodiment of the present invention is shown.

In step 100, the current limiting device 36 buffers a source voltage from a reflected voltage of at least one of the cells.

In step 102, the controller 44 may randomly determine which of the cells 32 to balance. The cells 32 are divided into subgroups. Each subgroup, for example, may have four cells, which are activated via the switches 42 during balancing. The subgroups are balanced for approximately an equal amount of time. Each cell 32 may be a member of more than one subgroup. There are n!/(n-m)! possible subgroups that may be selected, where n is the number of cells and m is the number of cells per group. Since each subgroup is balanced and since each subgroup has members, which are also members of other subgroups, normally functioning cells 32 are balanced to the same voltage and hence the same state of charge.

In step 104, transformer/rectifier circuits 34 preferentially charge a cell having a lowest state of charge within the determined subgroup to balance. The preferential charging arises from current hogging by the cell with the lowest state of charge. The cell having the lowest state of charge, as compared with other cells in the same battery, is charged when an associated differential voltage is greater than a first predetermined value. The transformer/rectifier circuits 34 prevent cells, not having the lowest state of charge, from being charged when associated differential voltages are less than a second predetermined value. This is described in further detail below.

Referring again to FIG. 2, for example, assume that the first cell $B_1$ has a voltage potential of 3.5V and that voltage potentials across the remaining cells are 4.0V, and further assume that the second cell $B_2$ is being charged. From circuit analysis, secondary voltages $T_1$, across the first diode 68 and a first upper half 58 and the second diode 78 and a first lower half 60 are one diode drop higher in voltage potential than 3.5V. Assuming the forward bias voltages of the first diode 68 and the second diode 78 to be approximately 0.6V, the secondary voltages $T_1$ are 4.1V. When the first transformer 67 has a turns ratio N that is equal to 10, then a primary voltage that is common to each transformer/rectifier circuit 34 is 41V, or the number of turns N multiplied by the secondary voltages $T_1$.

Since each transformer/rectifier circuit 34 shares a common primary voltage, secondary voltages $T_2$ through $T_N$ are at 4.1V. Since cells 32, other than the first cell $B_1$, are assumed to be at 4.0V, 0.1V is available to forward bias the diodes 48 and the rectifiers thus are in an 'OFF' state. Therefore, power is transferred by the system 12 to the cell having the lowest state of charge, the first cell $B_1$ in this example. The cell voltages are balanced without an intervening control system, as in prior art balancing systems. Upon completing step 104 the system 12 returns to step 100.

The above-described steps, are meant to be an illustrative example, the steps may be performed synchronously, continuously, or in a different order depending upon the application.

The present invention therefore provides an efficient and reliable battery balancing system that increases life of a battery. The system provides random subgroup balancing which allows the to charge each cell to an equal state of charge even when one or more cells are unable to be charged. The present invention reduces number of variables that may be addressed in performing cell balancing. Also, power dissipated during cell balancing is reduced by a ratio of number of cells in a subgroup to number of cells in a battery. The battery balancing system of the present invention minimizes number of system components, weight of a spacecraft, system complexity both in component quantity and control logic, and is cost effective.

The above-described apparatus and method, to one skilled in the art, is capable of being adapted for various applications and systems including: aeronautical systems, land-based systems, commercial systems, terrestrial industrial systems, vehicle systems, or other applications or systems known in the art. The above-described invention can also be varied without deviating from the true scope of the invention.

What is claimed is:

1. A battery cell balancing system for a battery having a plurality of cells comprising:
   a power supply;
   a plurality of transformer/rectifier circuits electrically coupled to the plurality of cells and preferentially charging a cell of the plurality of cells having a lowest state of charge; and
   at least one current limiting device electrically coupled to said plurality of transformer/rectifier circuits and said power supply, said current limiting device buffering a source voltage from a reflected voltage of at least one of the plurality of cells.

2. A system as in claim 1 further comprising:
   a plurality of balancing switches electrically coupled to said plurality of transformer/rectifier circuits allowing at least one cell to charge when an associated differential voltage is greater than a first predetermined value; and
   a controller, electrically coupled to said plurality of balancing switches, said controller operating said plurality of balancing switches in response to determining which cells of the plurality of cells to balance.

3. A system as in claim 1 further comprising:
   a plurality of balancing switches electrically coupled to said plurality of transformer/rectifier circuits allowing at least one cell to charge when an associated differential voltage is greater than a first predetermined value and preventing at least one cell from charging when an associated differential voltage is less than a second predetermined value; and
   a controller electrically coupled to said plurality of balancing switches, said controller operating said plurality of balancing switches in response to determining which cells of the plurality of cells to balance.

4. A system as in claim 1 wherein the plurality of cells are divided into subgroups and said controller determines which subgroup in said subgroups to balance.

5. A system as in claim 1 wherein a cell in said plurality of cells is a member of a plurality of subgroups.

6. A system as in claim 1 wherein the plurality of cells are divided into subgroups and said controller randomly determines which subgroup to balance.

7. A system as in claim 1 wherein the plurality of cells are divided into subgroups and said controller balances said subgroups for an equal amount of time.

8. A system as in claim 1 wherein the said controller determines which selected cells of the plurality of cells to balance and allows preferential charging of said selected cells.

9. A system as in claim 1 wherein each of said transformer/rectifier circuits are associated with at least one cell in the plurality of cells.

10. A system as in claim 2 wherein each of said balancing switches are associated with at least one transformer/rectifier circuit in said plurality of transformer/rectifier circuits.

11. A system as in claim 1 further comprising a power bus electrically coupled to said power source and the plurality of cells, said power bus performing as an alternating current power source.

12. A method of balancing battery cells for a battery having a plurality of cells comprising:
    buffering a source voltage from a reflected voltage of at least one of the plurality of cells; and
    preferentially charging a cell having a lowest stale of charge.

13. A method as in claim 12 further comprising:
    allowing at least one cell to charge when an associated differential voltage is greater than a first predetermined value; and
    preventing at least one cell from charging when an associated differential voltage is less than a second predetermined value.

14. A method as in claim 12 further comprising allowing at least one cell to charge when an associated differential voltage is greater than a first predetermined value.

15. A method as in claim 12 further comprising:
    determining which cells to balance in the plurality of cells; and
    allowing preferential charging of said selected cells.

16. A method as in claim 12 further comprising;
    dividing the plurality of cells into subgroups; and
    randomly determining which subgroup to balance.

17. A method as in claim 12 further comprising:
dividing the plurality of cells into subgroups; and
balancing said subgroups for an equal amount of time.

18. A method as in claim 12 further comprising:
dividing the plurality of cells into subgroups;
balancing a first subgroup comprising a cell of interest in the plurality of cells; and
balancing a second subgroup also comprising said cell of interest.

19. A battery cell balancing system for a battery having a plurality of cells comprising:
a plurality of transformer/rectifier circuits electrically coupled to the plurality of cells;
a plurality of balancing switches electrically coupled to said plurality of transformer/rectifier circuits allowing at least one cell of the plurality of cells to charge when an associated differential voltage is greater than a first predetermined value;
at least one current limiting device electrically coupled to said plurality of transformer/rectifier circuits and a power supply, said current limiting device buffering a source voltage from a reflected voltage of at least one of the plurality of cells; and
a controller electrically coupled to said plurality of balancing switches, said controller operating said plurality of balancing switches in response to determining whether to charge a cell in the plurality of cells and allowing preferentially charging of the plurality of cells.

20. A system as in claim 19 wherein said plurality of transformer/rectifier circuits allowing at least one cell to charge when an associated differential voltage is greater than a first predetermined value and preventing at least one cell from charging when an associated differential voltage is less than a second predetermined value.

* * * * *